(12) United States Patent
Mazur

(10) Patent No.: US 9,951,900 B2
(45) Date of Patent: Apr. 24, 2018

(54) EXTERNAL SEAL FOR ISOLATING AN ELBOW FITTING

(71) Applicant: Ivan Mazur, Leduc (CA)

(72) Inventor: Ivan Mazur, Leduc (CA)

( * ) Notice: Subject to any disclaimer, the term of this patent is extended or adjusted under 35 U.S.C. 154(b) by 0 days.

(21) Appl. No.: 15/465,142

(22) Filed: Mar. 21, 2017

(65) Prior Publication Data

US 2018/0087702 A1    Mar. 29, 2018

(30) Foreign Application Priority Data

Sep. 26, 2016  (CA) ...................................... 2943106

(51) Int. Cl.
| | |
|---|---|
| *F16L 41/06* | (2006.01) |
| *B23B 41/08* | (2006.01) |
| *F16L 3/00* | (2006.01) |
| *F16L 3/08* | (2006.01) |

(52) U.S. Cl.
CPC ................. *F16L 41/06* (2013.01); *F16L 3/00* (2013.01); *F16L 3/08* (2013.01); *Y10T 137/0463* (2015.04); *Y10T 137/612* (2015.04); *Y10T 137/6123* (2015.04)

(58) Field of Classification Search
CPC . F16L 41/06; Y10T 137/6123; Y10T 137/612
See application file for complete search history.

(56) References Cited

U.S. PATENT DOCUMENTS

| | | | |
|---|---|---|---|
| 3,643,986 A | 2/1972 | Allan | |
| 4,270,559 A | 6/1981 | Wallberg | |
| 4,537,071 A | 8/1985 | Waterman | |
| 4,859,403 A | 8/1989 | Dixon et al. | |
| 4,886,305 A | 12/1989 | Martin | |
| 5,022,684 A | 6/1991 | Eagon | |
| 5,058,620 A | 10/1991 | Jiles | |
| 5,400,492 A | 3/1995 | Hodgson et al. | |

(Continued)

FOREIGN PATENT DOCUMENTS

| | | |
|---|---|---|
| CA | 2 515 275 A1 | 2/2007 |
| GB | 837399 | 6/1960 |

OTHER PUBLICATIONS

"Pipeline Plugs and Accessories / Products," M.E. Barber Company, <http://www.mebarberco.com> at least as early as 2003, 2 pages.

(Continued)

*Primary Examiner* — Craig Schneider
*Assistant Examiner* — Kevin Barss
(74) *Attorney, Agent, or Firm* — Christensen O'Connor Johnson Kindness PLLC

(57) ABSTRACT

An external seal for sealing against an elbow fitting of a fluid line has an elbow clamp and a seal. The elbow clamp has a first part that is sized and shaped to engage the outer radiused curve of the elbow fitting, and a second part that engages the inner radiused curve of the elbow fitting. The first part defines a tool opening and a tool engagement profile sealingly engages a valve in axial alignment with the tool opening. A clamping member brings the first part into engagement with the outer radiused curve of the elbow fitting. The seal is adjacent to the first part of the elbow clamp in line with the tool opening and seals around the tool opening between the elbow clamp and the elbow fitting when the clamping force is applied.

9 Claims, 4 Drawing Sheets

(56) References Cited

U.S. PATENT DOCUMENTS

| | | | |
|---|---|---|---|
| 5,519,929 A | 5/1996 | Bleckman | |
| 6,108,391 A | 8/2000 | Deaver et al. | |
| 6,343,616 B1 | 2/2002 | Houtchens | |
| 6,505,783 B1 | 1/2003 | Lazarski, Jr. et al. | |
| 6,640,827 B1 | 11/2003 | McClure | |
| 6,892,752 B2 | 5/2005 | Burlock et al. | |
| 7,617,963 B1 * | 11/2009 | Jensen | F16L 3/1226 228/44.5 |
| 7,665,481 B2 | 2/2010 | Mazur | |
| 8,151,817 B2 | 4/2012 | Mazur | |
| 8,646,732 B2 * | 2/2014 | Birch | F16L 1/0246 248/59 |
| 8,666,017 B2 | 3/2014 | Jensen | |
| 9,410,655 B2 * | 8/2016 | Carson | F16L 55/11 |
| 2012/0090719 A1 | 4/2012 | Wang et al. | |

OTHER PUBLICATIONS

"Small Drilling Machines," Mueller Co. Gas Products Division, Product Catalog, at least as early as 2003, 1 page.

* cited by examiner

EXTERNAL SEAL FOR ISOLATING AN ELBOW FITTING

TECHNICAL FIELD

This relates to a seal that engages an external surface of an elbow fitting to allow for a hot tapping operation.

BACKGROUND

Hot tapping is used to service, replace, or add onto a fluid line, such as a natural gas line. U.S. Pat. No. 8,151,817 (Mazur) entitled "Apparatus for Isolating an Elbow fitting" describes a device that may be used to seal around an elbow seal to allow it to be hot tapped. The device in Mazur included a two-part, rigid housing that enclosed the elbow, and a rubber insert that filled the space within the rigid housing around the elbow.

SUMMARY

According to an aspect, there is provided an external seal for sealing against an elbow fitting of a fluid line, the elbow fitting having an external surface with an inner radiused curve and an outer radiused curve, the external seal comprising an elbow clamp comprising a first part, that is sized and shaped to engage the outer radiused curve of the elbow fitting, the first part defining a tool opening that extends through the first part, a tool engagement profile that sealingly engages a valve in axial alignment with the tool opening, and a second part that engages the inner radiused curve of the elbow fitting, a clamping member that selectively applies a clamping force between the second part and the first part to bring the first part into engagement with the outer radiused curve of the elbow fitting, a seal adjacent to the first part of the elbow clamp in line with the tool opening, the seal sealing around the tool opening between the inner surface of the elbow clamp and the outer radiused curve of the elbow fitting when the clamping force is applied.

According to another aspect, the first part and the second part may be disconnectable.

According to another aspect, the clamping member may be a bolt.

According to another aspect, the seal may be made from a resilient material.

According to another aspect, the seal may define a tool opening that axially aligns with the tool opening of the first part of the elbow clamp.

According to another aspect, the tool engagement profile may be a threaded opening in axial alignment with the tool opening.

According to another aspect, the seal may have an opening and a semi-circular surface that engages the outer radiused curve and is open on the bottom.

According to another aspect, the tool opening of the first part of the elbow clamp may be axially aligned with an inner bore of the fluid line.

According to another aspect, the elbow clamp may comprise an alignment member that applies an alignment force to adjust the orientation of the tool opening relative to the elbow fitting.

According to an aspect, there is provided a method of hot tapping an elbow fitting of a fluid line, the elbow fitting having an external surface with an inner radiused curve and an outer radiused curve, the method comprising the steps of positioning a first part of an elbow clamp and a seal on the outer radiused curve of the elbow fitting, the first part defining a tool opening that extends through the first part and the seal being aligned with the tool opening, positioning a second part of the elbow clamp on the inner radiused curve of the elbow fitting, applying a clamping force between the elbow clamp and the elbow fitting until the seal seals around the tool opening between the inner surface of the elbow clamp and the outer radiused curve of the elbow fitting, and attaching a hot tapping tool to the tool opening of the first part.

According to another aspect, the first part and the second part may be disconnectable.

According to another aspect, the clamping force may be applied by adjusting a length adjustable member that engages each of the first and second parts of the elbow clamp.

According to another aspect, the length adjustable member may be a bolt.

According to another aspect, the seal may be made from a resilient material.

According to another aspect, the seal may define a tool opening that axially aligns with the tool opening of the first part of the elbow clamp.

According to another aspect, the tool opening may comprise a threaded engagement profile in axial alignment with the tool opening.

According to another aspect, the seal may have an opening and a semi-circular surface that engages the outer radiused curve and is open on the bottom.

According to another aspect, the method may further comprise the step of aligning the tool opening of the first part of the elbow clamp with an inner bore of the fluid line.

According to another aspect, the tool opening of the first part of the elbow clamp may be aligned with an inner bore of the fluid line by adjusting an alignment member to adjust the orientation of the tool opening relative to the elbow fitting.

According to another aspect, the method may further comprise the step of operating the hot tapping tool to create a hole in the elbow fitting to provide access to the fluid line, and installing a seal in the fluid line through the hole, wherein the hot tapping tool comprises a valve attached to the tool opening, a drill bit removably attachable to the valve, and a seal setting tool removably attachable to the valve.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
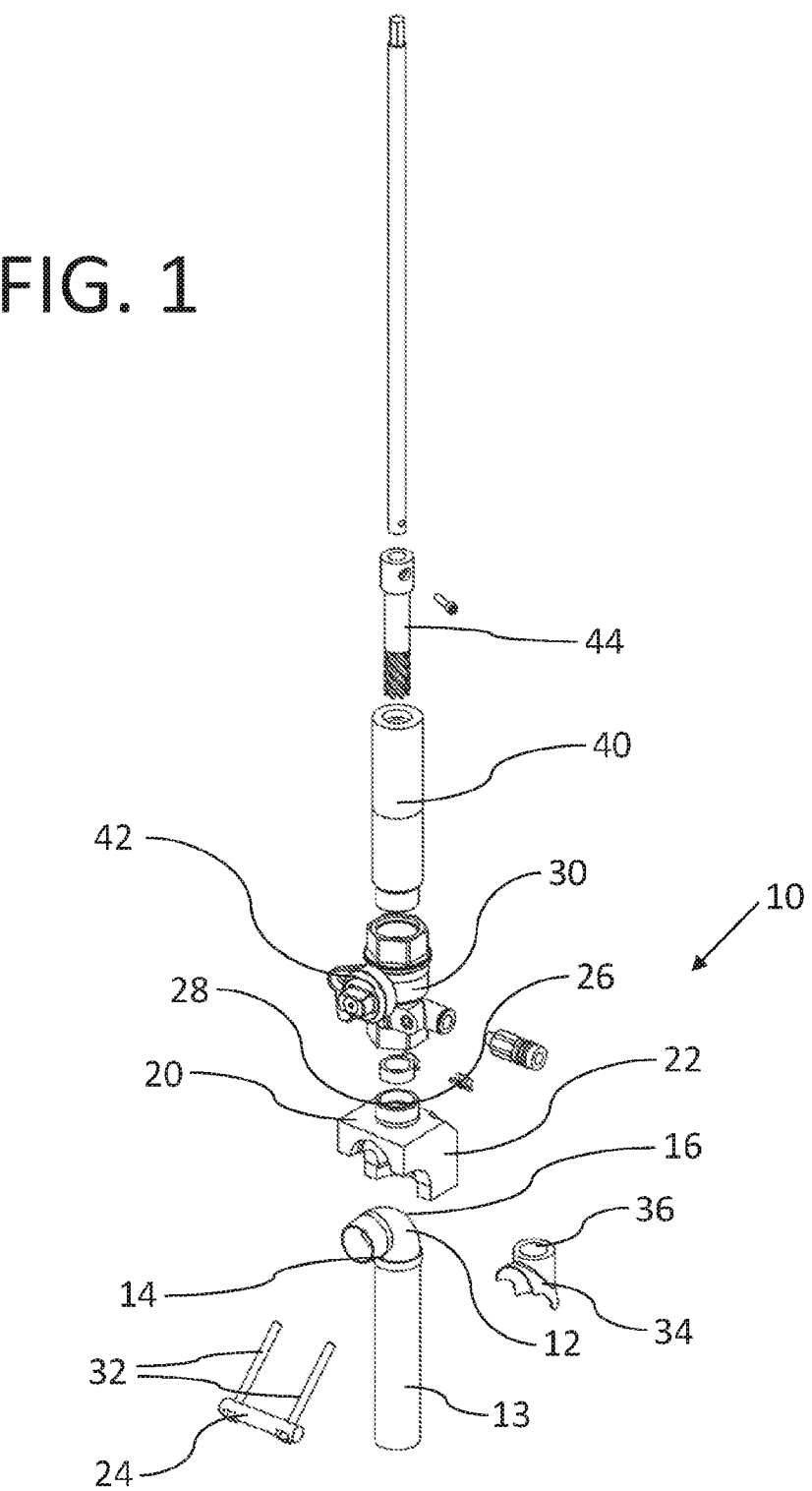
FIG. 1 is an exploded view of an external seal with a hot tapping tool secured to an elbow fitting.

An external seal, generally identified by reference numeral ill now be described with reference to FIG. 1 through 4.

Referring to FIG. 1, external seal 10 is used to seal against an elbow fitting 12. Elbow fitting 12 has an external surface with an inner radiused curve 14 and an outer radiused curve 16. External seal 10 is designed to attach to elbow fitting 12 and seal against outer radiused curve 16 to allow elbow fitting 12 to be hot-tapped. Elbow fitting 12 includes an elbow clamp 20, which has a first part 22 that is sized and shaped to engage outer radiused curve 16 of elbow fitting 12, and a second part 24 that engages inner radiused curve 14 of elbow fitting 12. As elbow clamp 20 is clamped onto elbow fitting 12, first and second parts 22 and 24 are pulled together to secure elbow clamp 20.

First part 22 of elbow clamp 20 defines a tool opening 26 that extends through first part 22. Tool opening 26 is used to allow the hot tapping operation to occur and has a tool engagement profile 28 that sealingly engages a valve 30 in axial alignment with tool opening 26. As shown, tool opening 26 is circular and extends out from first part 22 in axial alignment with the inner bore of the fluid line 13 to which elbow fitting 12 is attached. Engagement profile 28 is preferably an external thread applied to the outer surface of tool opening 26, which allows a hot tapping tool, discussed below, to be attached to elbow clamp 20. The depicted design presents a straightforward design that is easy to use and provides the necessary seal. It will be understood that first part 22 may be designed with other types of tool openings 26 and other types of engagement profiles 28 that will be known by those skilled in the art, and depending on the preferences of the user, as long as the design is able to provide the necessary engagement and permit the hot tapping operation to occur.

Figure 2:
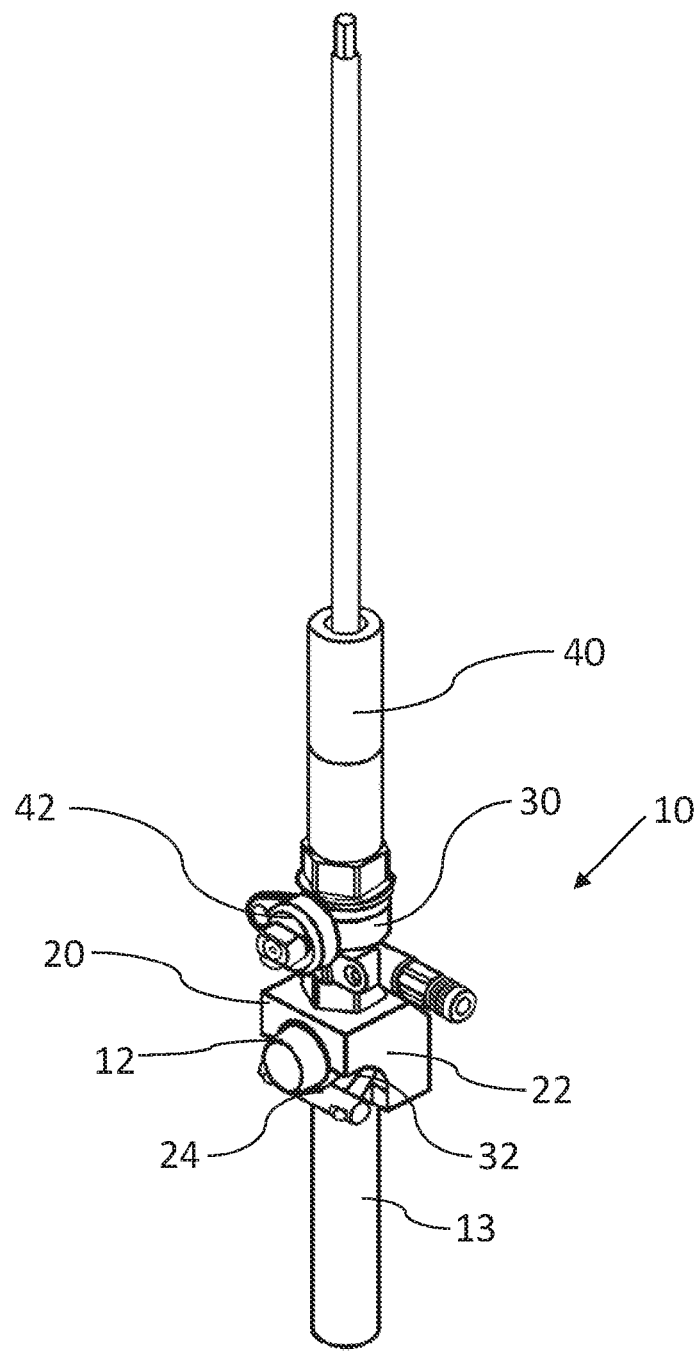
FIG. 2 is a perspective view of the external seal with a hot tapping tool secured to an elbow fitting of FIG. 1.
Figure 3:
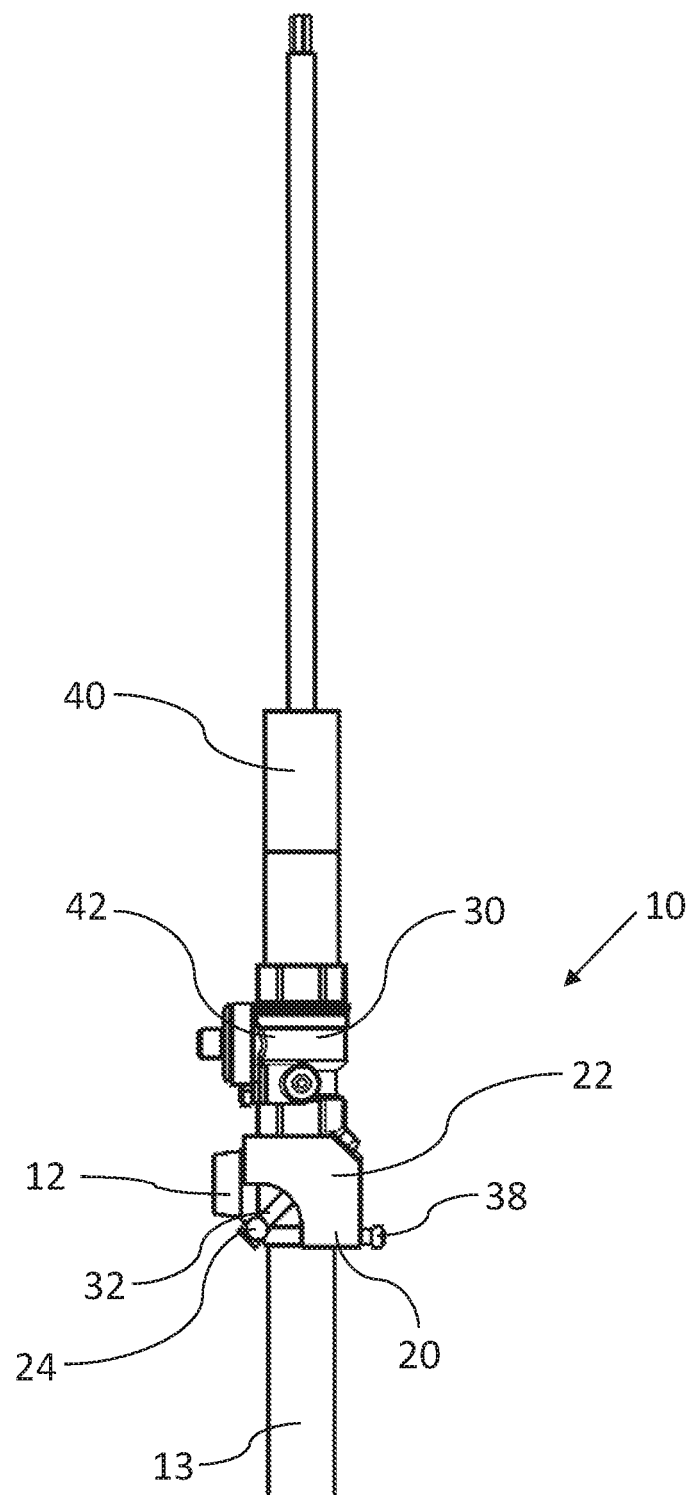
FIG. 3 is a side elevation view of the external seal with a hot tapping tool secured to an elbow fitting of FIG. 1.

Second part 24 of elbow clamp 20 is used to pull first part 22 down into sealing engagement with elbow fitting 12. As shown in FIG. 2 and FIG. 3, this is done by tightening bolts 32 on either side of elbow fitting 12 that extend between first part 22 and second part 24. It will be understood that bolts 32 may be replaced with other length adjustable members or clamping devices that selectively move the second part toward the first part, such as a ratchet, strap, etc. Preferably, first and second parts 22 and 24 are disconnectable, such that elbow fitting 12 can be easily inserted within elbow clamp 20. Elbow clamp 20 may also be designed with other types of openings.

As first part 22 is pulled toward elbow fitting 12, the sealing engagement is created using a seal 34 that is adjacent to first part 22 of elbow clamp 20. Seal 34 is positioned to be in line with tool opening 26, with seal 34 sealing around tool opening 26 between the inner surface of elbow clamp 20 and the outer radiused curve 16 of elbow fitting 12 when the clamping element 32 applies the clamping force.

As shown, seal 34 preferably has an opening 36 and a semi-circular surface that engages the outer radiused curve. Seal 34 is also preferably open on the bottom while being large enough to create a sufficient seal around tool opening 26, but it is unnecessary to fully encapsulate elbow fitting 12. The benefit of this is that the same elbow clamp 20 can be used for elbow fittings of different sizes and shapes by simply replacing seal 34, such as an elbow fitting that is male-male, female-female, male-female, or female-male. Furthermore, while most elbow fittings 12 have a consistent size based on the inner diameter, there may be some variations based on tolerances, manufacturers, etc. Within a particular size range of elbow fitting 12, the use of seal 34 and elbow clamp 20 with first and second parts 22 and 24 allows a clamping force to be applied that causes seal 34, made from a resilient material, to conform to variations in size, in addition to allowing seal 34 to be replaced with a more suitably sized or shaped seal 34, to properly seal around tool opening 26.

In order to seal tool opening 26 and provide access to elbow fitting 12, seal 34 preferably has a corresponding opening 36. Opening 36 may be the same diameter as tool opening 26, or tool opening 26 and opening 36 may be designed such that opening 36 is nested within tool opening 26. In the latter design, tool opening 26 would be oversized, and opening 36 in seal 34 would be the proper size to engage the tool that will be inserted therethrough.

Figure 4:
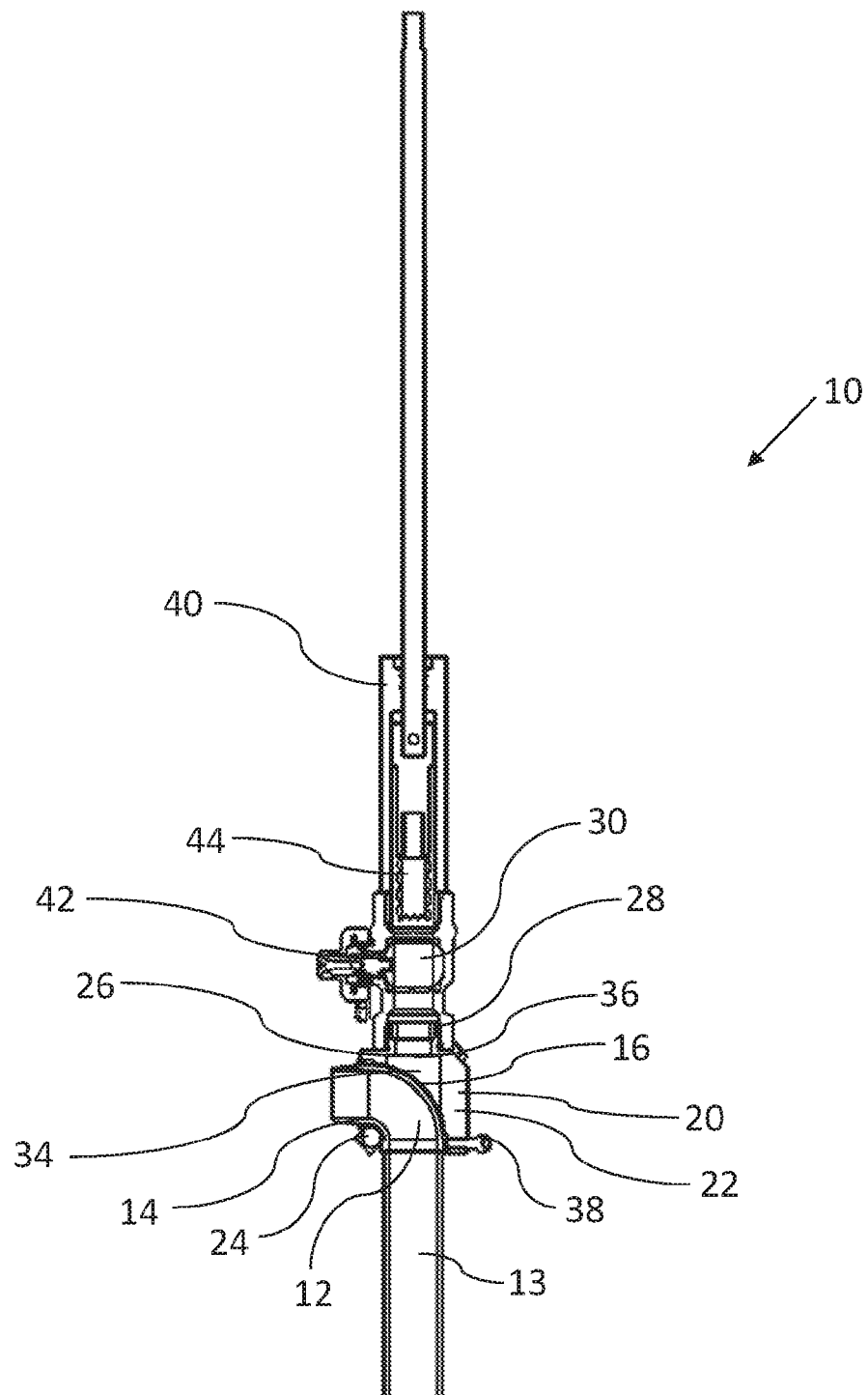
FIG. 4 is a side elevation view in section of the external seal with a hot tapping tool secured to an elbow fitting of FIG. 1.

In the depicted embodiment, first and second parts 22 and 24 are pulled together at about a 45 degree angle around elbow fitting 12, elbow clamp 20 may twist or rock on elbow fitting 12. To counter this, and to place tool opening 26 in alignment with the inner bore, an alignment device, such as a set screw 38, may be used to apply a force to pivot elbow clamp 20 relative to elbow fitting 12, as shown in FIG. 4. The number and location of set screws 38 may vary depending on the preferences of the user to ensure proper alignment is achieved.

An example of a method for using external seal 10 to hot tap a fluid line 13 via elbow fitting 12 will now be described. First, elbow fitting 12 is identified and characterized to select an appropriately sized and shaped seal 34. Seal 34 is placed within first part 22 of elbow clamp 20 and placed against outer radiused curve 16 of elbow fitting 12. Second part 24 is then placed against inner radiused curve 14 and clamping elements 32 are adjusted such that seal 34 is pulled tight against elbow fitting 12 and first part 22, such that a seal is created. Once properly sealed, a hot tapping tool 40 is attached to engagement profile 28 of tool opening 26. Elbow clamp 20 may be adjusted using alignment screw 38 such that tool opening 26 is properly aligned with elbow fitting 12 and fluid line 13, either below or after hot tapping tool 40 is attached.

The depicted hot tapping tool 40 includes a valve section 42, and a drill section 44. Drill section 44 is used to drill a hole in the curved portion of elbow fitting 12. Drill section 44 is then withdrawn, and valve section 42 is closed while drill section 44 is replaced by other tools (not shown), such as a seal placement tool that places a seal within fluid line 13 upstream of elbow fitting 12. By placing a seal within fluid line 13, elbow fitting 12 can then be removed and replaced with different fittings or equipment, as desired.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. An external seal for sealing against an elbow fitting of a fluid line, the elbow fitting having an external surface with an inner radiused curve and an outer radiused curve, the external seal comprising:

an elbow clamp comprising:
   a first part that is sized and shaped to engage the outer radiused curve of the elbow fitting, the first part defining a tool opening that extends through the first part;
   a tool engagement profile that sealingly engages a valve in axial alignment with the tool opening; and
   a second part that engages the inner radiused curve of the elbow fitting;
   a clamping member that selectively applies a clamping force between the second part and the first part to bring the first part into engagement with the outer radiused curve of the elbow fitting;
a seal adjacent to the first part of the elbow clamp in line with the tool opening, the seal sealing around the tool opening between an inner surface of the elbow clamp and the outer radiused curve of the elbow fitting when the clamping force is applied.

2. The external seal of claim 1, wherein the first part and the second part are disconnectable.

3. The external seal of claim 1, wherein the clamping member is a bolt.

4. The external seal of claim 1, wherein the seal is made from a resilient material.

5. The external seal of claim 1, wherein the seal defines a tool opening that axially aligns with the tool opening of the first part of the elbow clamp.

6. The external seal of claim 1, wherein the tool engagement profile is a threaded opening in axial alignment with the tool opening.

7. The external seal of claim 1, wherein the seal has an opening and a semi-circular surface that engages the outer radiused curve and is open on the bottom.

8. The external seal of claim 1, wherein the tool opening of the first part of the elbow clamp is axially aligned with an inner bore of the fluid line.

9. The external seal of claim 1, wherein the elbow clamp comprises an alignment member that applies an alignment force to adjust the orientation of the tool opening relative to the elbow fitting.

* * * * *